(12) United States Patent
Chen et al.

(10) Patent No.: US 6,791,829 B1
(45) Date of Patent: Sep. 14, 2004

(54) DISK DRIVE BRACKET

(75) Inventors: Yun-Lung Chen, Tu-Chen (TW); Jung-Chi Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/175,253

(22) Filed: Jun. 18, 2002

(30) Foreign Application Priority Data

Apr. 25, 2002 (TW) ...................................... 91205681 U

(51) Int. Cl.[7] .............................................. G06F 1/16
(52) U.S. Cl. ..................................... 361/685; 361/684
(58) Field of Search ................................ 361/600, 679, 361/683–686

(56) References Cited

U.S. PATENT DOCUMENTS 5,564,804 A * 10/1996 Gonzalez et al. ........ 312/223.2
5,566,049 A * 10/1996 Nguyen ..................... 361/685
6,297,954 B1 * 10/2001 Seo ............................ 361/686
6,452,792 B1 * 9/2002 Chen .......................... 361/685

* cited by examiner

Primary Examiner—Darren Schuberg
Assistant Examiner—Yean-Hsi Chang
(74) Attorney, Agent, or Firm—Wei Te Chung

(57) ABSTRACT

A disk drive bracket (1) includes a connecting bracket (10), a first bracket (20), and a second bracket (30). A first supporting member (14) and a second supporting member (16) sequentially extend from one side of the connecting bracket. A third supporting member (18) extends from an opposite side of the connecting bracket. Each supporting member includes a supporting board (144, 164, 184), and a locating board (142, 162, 182) having locating pins (150, 160, 183). The first and second brackets each have a side panel (24, 34) and a bottom panel (26, 36). Each bottom panel includes two parallel guiding flanges (264, 364). Locating pins (242, 244, 362) extend from the side panel of the first bracket, and from the bottom panel of the second bracket. The guiding flanges of the first and second brackets slidingly engage with the supporting boards of the second and third supporting members respectively.

20 Claims, 5 Drawing Sheets

DISK DRIVE BRACKET

BACKGROUND OF THE INVENTION

1. Field of the Invention

The present invention relates to computer disk drive brackets, and more particularly to a disk drive bracket for conveniently receiving data storage devices therein and installing in an enclosure.

2. Description of Related Art

A personal computer typically comprises data storage devices such as CD-ROM drives, floppy disk drives (FDDs) and hard disk drives (HDDs). These data storage devices are generally fixedly received in brackets within a computer enclosure.

To fix a data storage device such as a disk drive in an enclosure, a disk drive bracket is usually installed in the enclosure first. The n the disk drive is fixed in the disk drive bracket. This kind of conventional assembly process is unduly laborious and slow. In mass production facilities, the assembly process is liable to slow up a production line and lead to inefficiency and increased costs.

To overcome these difficulties, an alternative conventional assembly means comprises: firstly, fixing the disk drive in the disk drive bracket to form a disk drive bracket assembly; and then installing the disk drive bracket assembly in the enclosure.

There are numerous kinds of conventional disk drive bracket assemblies. These include using screws to fix the disk drive in the disk drive bracket, or alternatively fixing guiding rails on the disk drive and then slidingly inserting the disk drive into the disk drive bracket. However, using screws adds to component parts and costs. In addition, fastening or detachment of the screws using a tool is unduly laborious and time-consuming. Similarly, screws are generally needed to fix the guiding rails on the disk drive. Furthermore, using guiding rails usually creates spaces between the disk drive and the disk drive bracket. Electromagnetic radiation is liable to leak out from the disk drive bracket and generate a lot of static electricity in the enclosure.

Examples of conventional data storage device fastening structures are found in U.S. Pat. No. 5,510,955.

An improved disk drive bracket is desired to overcome the above-described disadvantages of the related art.

SUMMARY OF THE INVENTION

Accordingly, an object of the present invention is to provide a disk drive bracket that can conveniently receive data storage devices therein.

Another object of the present invention is to provide a disk drive bracket that has good grounding.

In order to achieve the objects set out above, a disk drive bracket of the present invention comprises a connecting bracket, a first bracket and a second bracket. The connecting bracket comprises an intermediate connecting board. A first supporting member integrally extends from one side of the connecting board, and a third supporting member integrally extends from an opposite side of the connecting board. A second supporting member integrally extends from a distal edge of the first supporting member. Each first, second and third supporting member comprises a supporting board and a locating board, and each locating board comprises a pair of locating pins. The second and third supporting members each comprise a spring arm formed in the supporting board, and a locating portion downwardly formed at a free end of the spring arm. The first and second brackets each comprise a side panel and a bottom panel. Each bottom panel comprises a pair of spaced and parallel guiding flanges, and a locating hole corresponding to a respective locating portion. Locating pins extend from the side panel of the first bracket, and from the bottom panel of the second bracket. The guiding flanges of the first bracket engage with the supporting board of the second supporting member. The guiding flanges of the second bracket engage with the supporting board of the third supporting member. The locating portions of the second and third supporting members are snappingly received in the locating holes of the first and second brackets respectively. The locating pins of the first, second and third supporting members and of the first and second brackets respectively retain data storage devices in spaces defined between the connecting bracket and the first and second brackets.

Other objects, advantages and novel features of the present invention will become more apparent from the following detailed description when taken in conjunction with the accompanying drawings, in which:

DETAILED DESCRIPTION OF THE INVENTION

Figure 1:
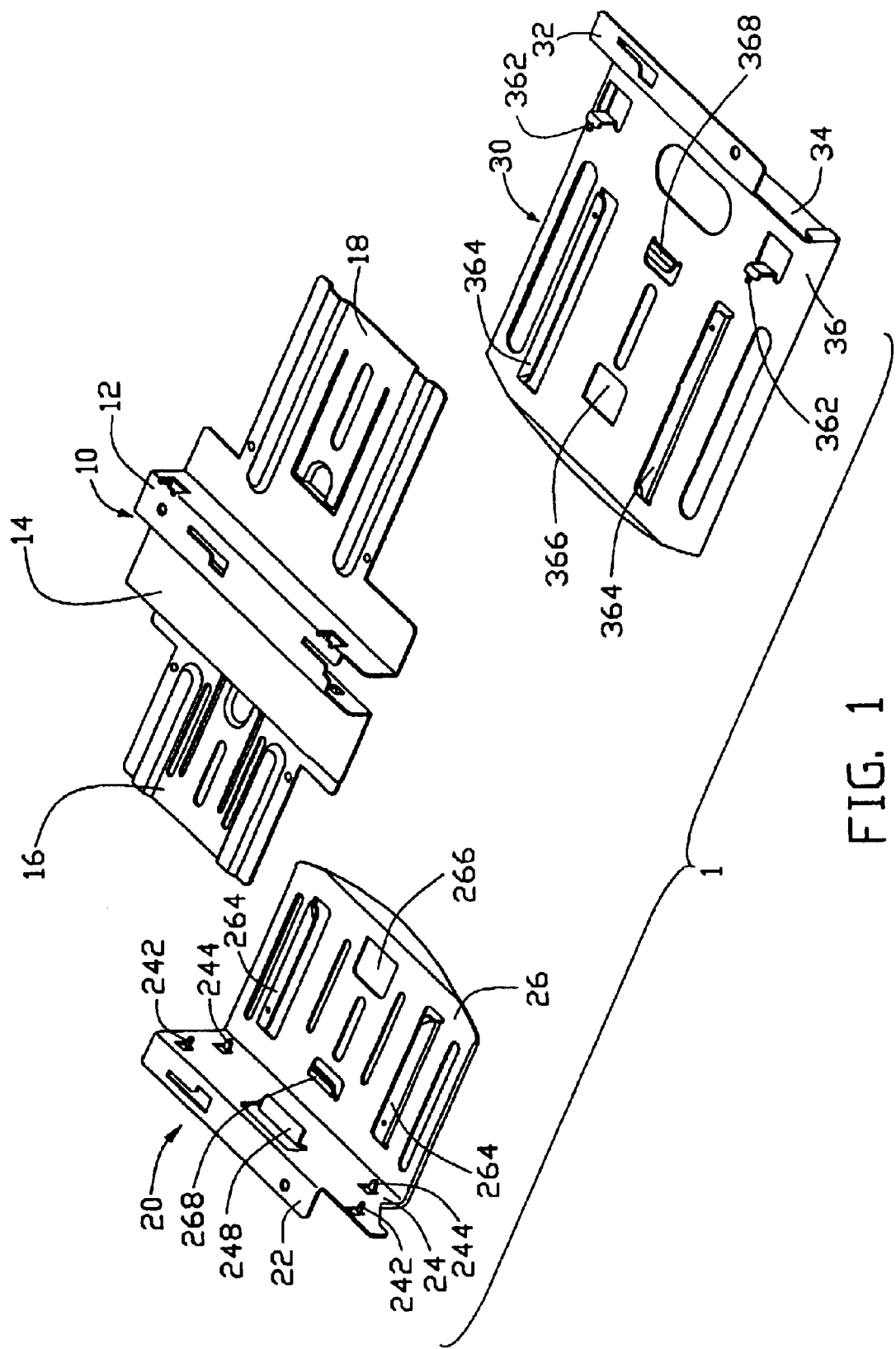
FIG. 1 is an exploded isometric view of a disk drive bracket in accordance with the present invention.

Reference will now be made to the drawing figures to describe a preferred embodiment of the present invention in detail.

Figure 5:
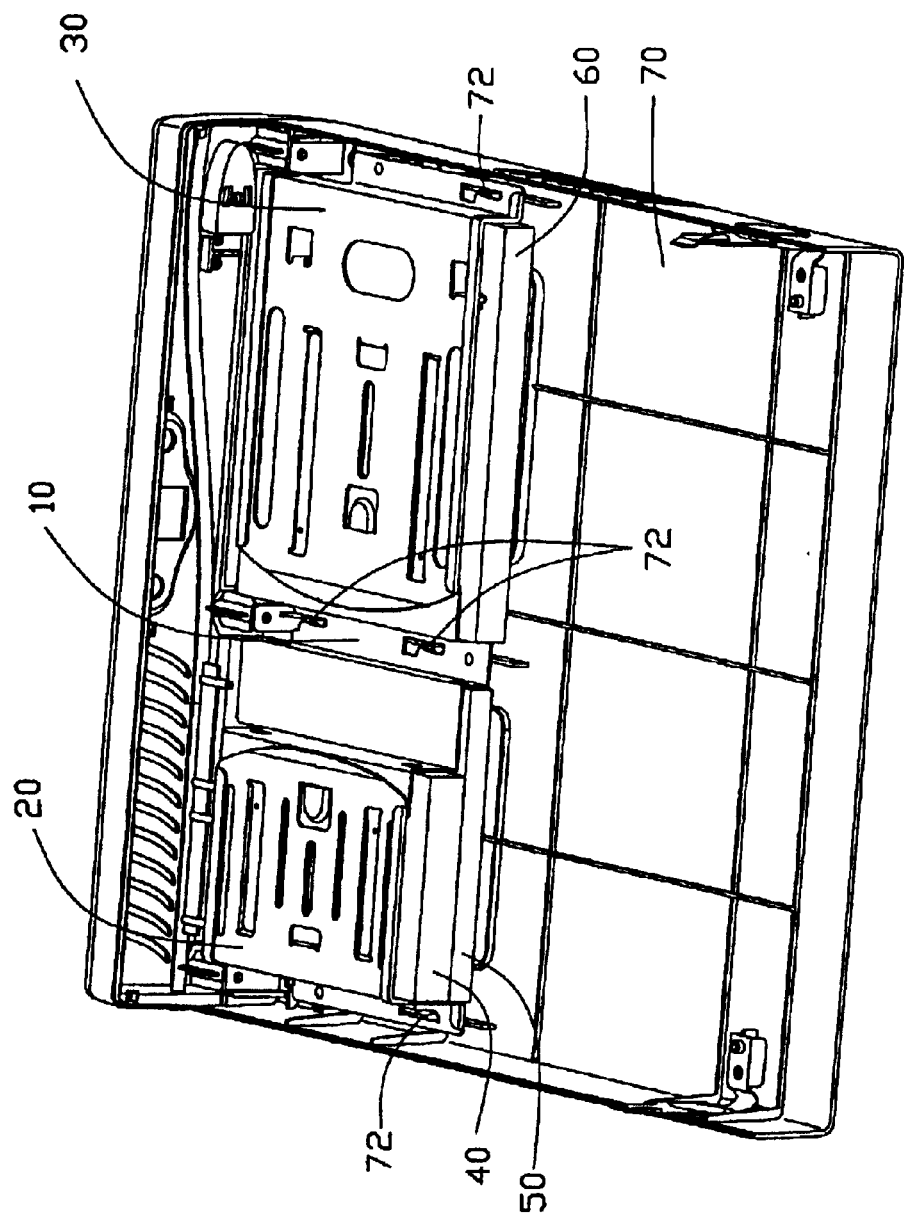
FIG. 5 is an isometric view of the entire assembly of FIG. 4 fastened to a cover of an enclosure, viewing said entire assembly from a reverse aspect.

Referring to FIGS. 1 and 5, a disk drive bracket 1 of the present invention is fastened to a cover 70 of an enclosure (not shown). The disk drive bracket 1 comprises a connecting bracket 10, a first bracket 20 and a second bracket 30.

Figure 2:
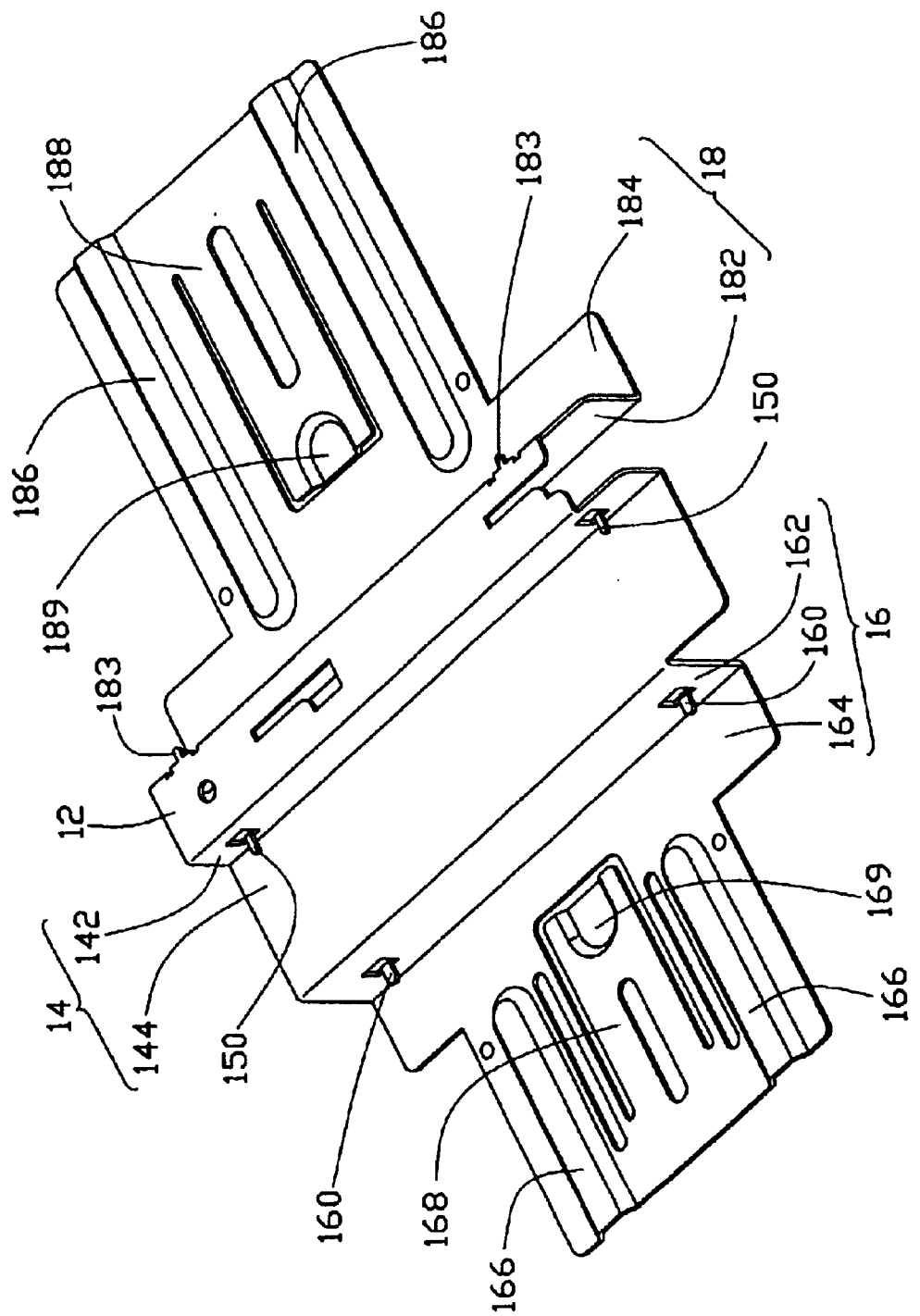
FIG. 2 is an enlarged isometric view of a connecting bracket of the disk drive bracket of FIG. 1, viewed from another aspect.
Figure 3:
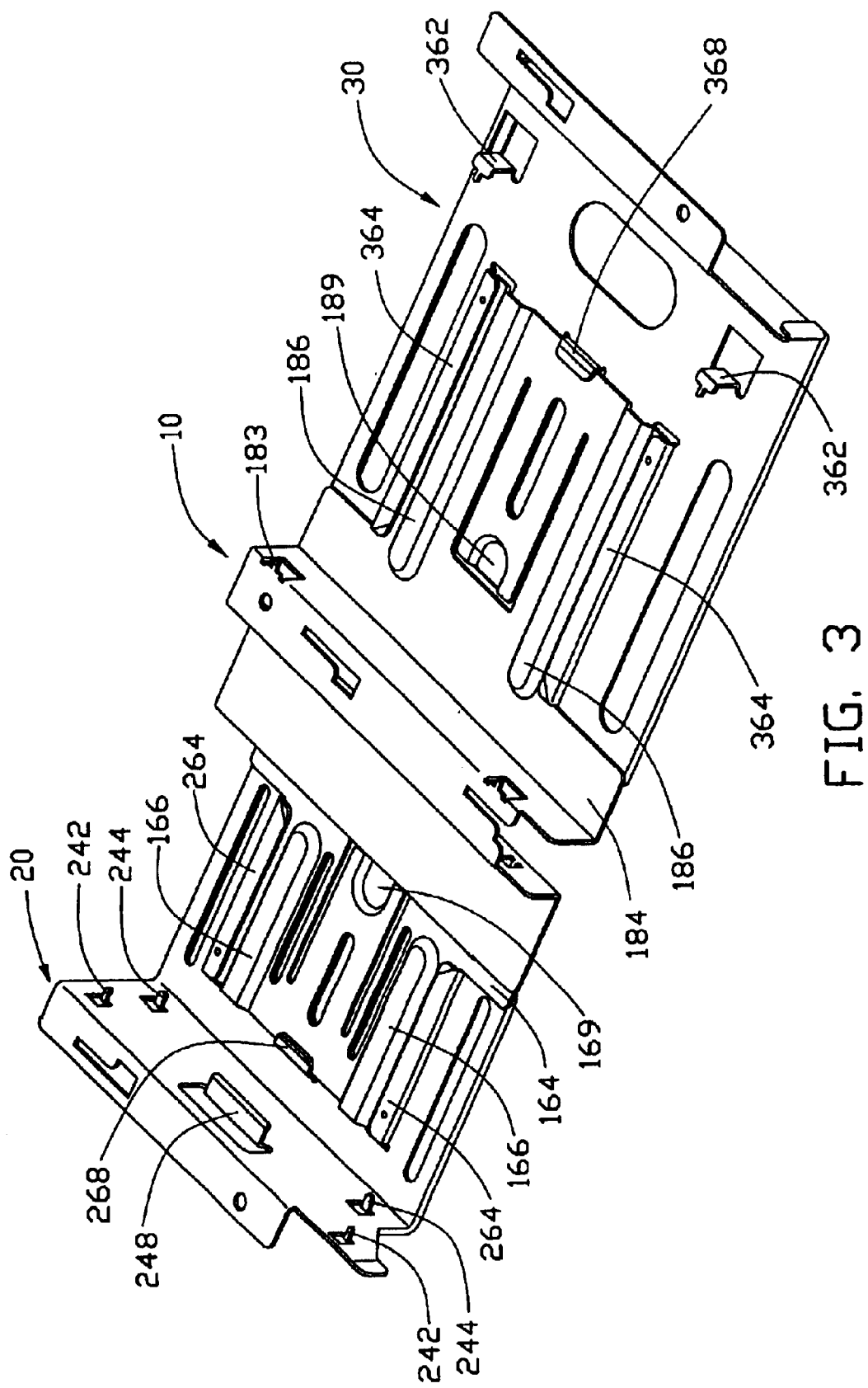
FIG. 3 is an assembled view of FIG. 1.

Referring also to FIGS. 2 and 3, the connecting bracket 10 comprises an intermediate connecting board 12. The connecting board 12 defines a screw hole and two slots (both not labeled), respectively corresponding to a screw seat (not labeled) and two securing clips 72 located at a center portion of the cover 70. A first supporting member 14 integrally extends from one side of the connecting board 12, and a third supporting member 18 integrally extends from an opposite side of the connecting board 12. A second supporting member 16 integrally extends from a distal edge of the first supporting member 14. The first supporting member 14 comprises a locating board 142 integrally depending from said one side of the connecting board 12, and a supporting board 144 integrally extending perpendicularly outwardly from a bottom of the locating board 142. The second supporting member 16 comprises a locating board 162 integrally depending from a distal edge of the supporting board 144, and a supporting board 164 integrally extending perpendicularly outwardly from a bottom of the locating board 162.

The third supporting member 18 comprises a locating board 182 integrally depending from said opposite side of the connecting bracket 10, and a supporting board 184 integrally extending perpendicularly outwardly from a bottom of the locating board 182. The locating boards 142, 162, 182 respectively comprise pairs of locating pins 150, 160, 183 that are respectively inserted into corresponding screw holes (not shown) of disk drives 40, 50, and a CD-ROM drive 60 (see FIG. 4). A pair of spaced elongated seats 166 is upwardly formed at opposite longitudinal sides respectively of the supporting board 164, for supporting the disk drive 40 thereon. A spring arm 168 is formed in the supporting board 164 between the seats 166. A locating portion 169 is downwardly formed at a free end of the spring arm 168. A pair of spaced elongated seats 186 is upwardly formed at opposite longitudinal sides respectively of the supporting board 184, for supporting the CD-ROM drive 60 thereon. A spring arm 188 is formed in the supporting board 184 between the seats 186. A locating portion 189 is downwardly formed at a free end of the spring arm 188.

The first bracket 20 is attached to the supporting board 164 of the connecting bracket 10, and cooperates with the first and second supporting members 14, 16 to define two spaces for respectively receiving the disk drives 40, 50 therein. The first bracket 20 comprises a fixing flange 22, a side panel 24, and a bottom panel 26. The fixing flange 22 defines a screw hole and a slot (both not labeled), respectively corresponding to a screw seat (not labeled) and a securing clip 72 located at one side of the cover 70. A cantilever 248 is inwardly bent from the side panel 24, and corresponds to the supporting board 144 of the first supporting member 14 for cooperatively supporting the disk drive 50. The side panel 24 inwardly forms a pair of spaced locating pins 242, and a pair of spaced locating pins 244 below the locating pins 242. The locating pins 242, 244 respectively correspond to the locating pins 150, 160 of the first and second supporting members 14, 16, for respective insertion into screws holes (not shown) of the disk drives 50, 40. A pair of spaced and parallel guiding flanges 264 is upwardly formed from the bottom panel 26 near opposite longitudinal sides thereof respectively, for slidingly receiving the supporting board 164 of the second supporting member 16 therebetween. Each guiding flange 264 has an L-shaped profile, with free edges of the guiding flanges 264 opposing each other across the bottom panel 26. A locating hole 266 is defined in the bottom panel 26 distal from the side panel 24, for receiving the locating portion 169 of the second supporting member 16 therein. An L-shaped stop 268 is upwardly formed from the bottom panel 26 near the side panel 24, for engagingly receiving a distal end of the supporting board 164.

The second bracket 30 is attached to the supporting board 184 of the connecting bracket 10, and cooperates with the third supporting member 18 to define a space for receiving the CD-ROM drive 60 therein. The second bracket 30 comprises a fixing flange 32, a side panel 34, and a bottom panel 36. The fixing flange 32 defines a screw hole and a slot (both not labeled), respectively corresponding to a screw seat (not labeled) and a securing clip 72 located at an opposite side of the cover 70. A pair of spaced and parallel guiding flanges 364 is upwardly formed from the bottom panel 36 near opposite longitudinal sides thereof respectively, for slidingly receiving the supporting board 184 of the third supporting member 18 therebetween. Each guiding flange 364 has an L-shaped profile, with free edges of the guiding flanges 364 opposing each other across the bottom panel 36. A locating hole 366 is defined in the bottom panel 36 distal from the side panel 34, for receiving the locating portion 189 of the third supporting member 18 therein. A pair of L-shaped locating pins 362 is upwardly formed from near the opposite longitudinal sides respectively of the bottom panel 36 near the side panel 34, for respective insertion into screw holes (not shown) of the CAROM drive 60. An L-shaped stop 368 is upwardly formed from a middle portion of the bottom panel 36, for engagingly receiving a distal end of the supporting board 184.

Figure 4:
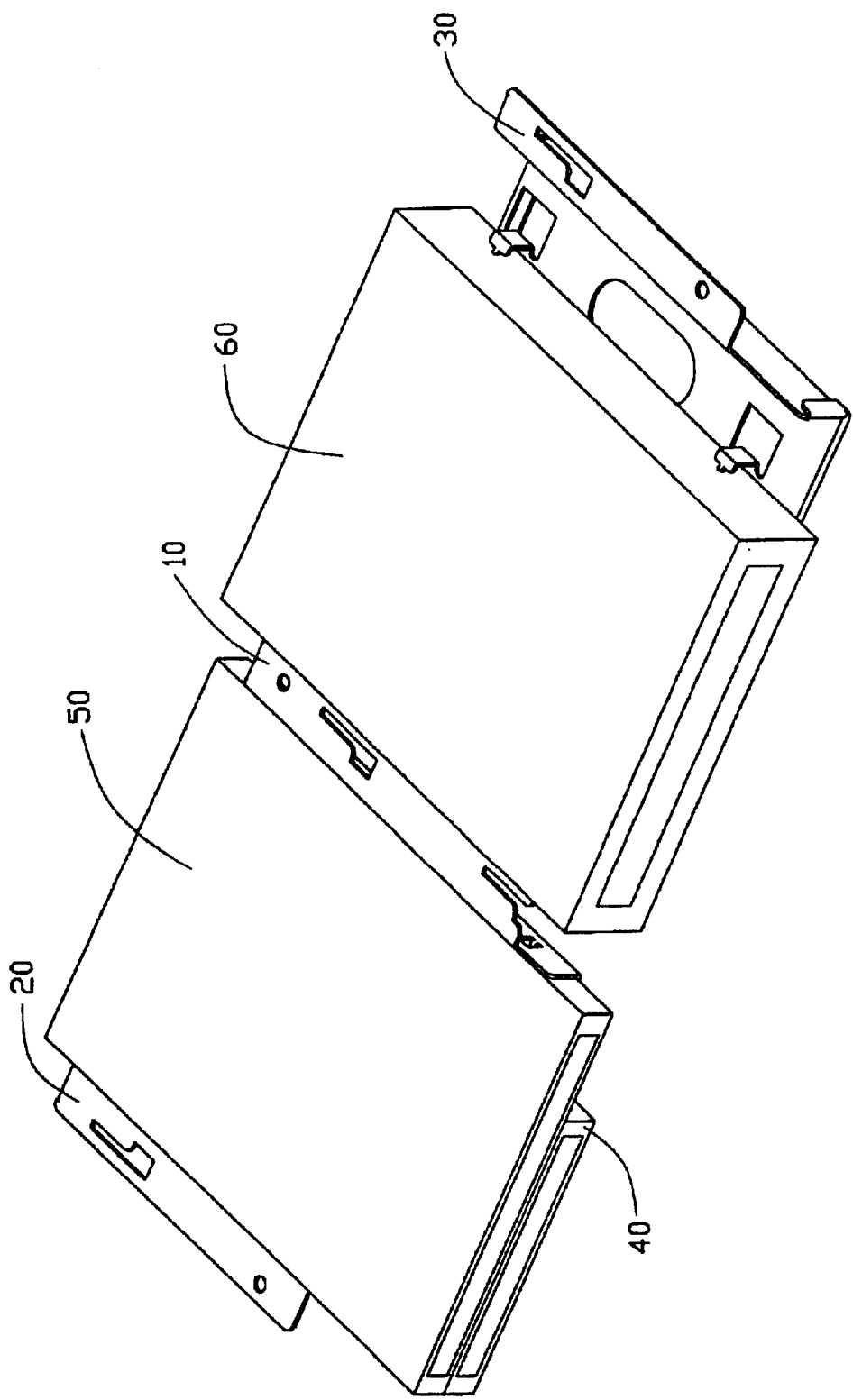
FIG. 4 is similar to FIG. 3, but showing two disk drives and a CD-ROM drive installed in the disk drive bracket.

Referring particularly to FIGS. 4 and 5, in assembly, the disk drive 40 is placed on the supporting board 164 of the connecting bracket 10. The disk drive 40 rests on the seats 166, and the locating pins 160 are inserted into the holes of one side of the disk drive 40. The first bracket 20 is then slidingly attached to the connecting bracket 10, with the guiding flanges 264 slidingly receiving the supporting board 164 therebetween. The first bracket 20 is thus slid toward the locating board 162 of the connecting bracket 10 until the cantilever 248 is located sufficiently close to the supporting board 144 to enable the disk drive 50 to be supported thereon. The disk drive 50 is placed on the cantilever 248 and supporting board 144, and the locating pins 150 are inserted into the holes of one side of the disk drive 50. The first bracket 20 is slid further toward the locating board 162. The locating pins 244 are inserted into the holes of an opposite side of the disk drive 40, and the locating pins 242 are inserted into the holes of an opposite side of the disk drive 50. The distal end of the supporting board 164 is engagingly received in the stop 268. The locating portion 169 is snappingly received in the locating hole 266. The CD-ROM drive 60 is then placed on the supporting board 184 of the connecting bracket 10. The CD-ROM drive 60 rests son the seats 186, and the locating pins 183 are inserted into the holes of one side of the CD-ROM drive 60. The second bracket 30 is slidingly attached to the connecting bracket 10, with the guiding flanges 364 slidingly receiving the supporting board 184 therebetween. The locating pins 362 are inserted into the holes of an opposite side of the CDROM drive 60. The distal end of the supporting board 184 is engagingly received in the stop 368. The locating portion 189 is snappingly received in the locating hole 366. Assembly of the disk drive bracket 1 is thus completed.

Thereafter, the disk drive bracket 1 can be attached to the cover 70. The slots (not labeled) of disk drive bracket 1 engagingly receive the securing clips 72 of the cover 70. The screw holes (not labeled) of the disk drive 1 are aligned with the screw seats (not labeled) of the cover 70. Screws are inserted through the screw holes and the screw seats, thereby securely fastening the disk drive bracket 1 to the cover 70.

It is to be understood, however, that even though numerous characteristics and advantages of the present invention have been set forth in the foregoing description, together with details of the structure and fiction of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A disk drive bracket for holding data storage devices in an enclosure, the disk drive bracket comprising:

a connecting bracket comprising a connecting board for fixing to the enclosure, a first supporting member arranged at one side of the connecting board, a third supporting member arranged at an opposite side of the connecting board, and a second supporting member arranged at a distal side of the first supporting member, each of the first, second and third supporting members comprising a supporting board and a locating board, the locating board comprising at least one locating pin, the second and third supporting members each comprising a spring arm, a locating portion being arranged at a free end of the spring arm;

a first bracket slidably engaging with the second supporting member of the connecting bracket, the first bracket comprising a bottom panel and a side panel, the side panel having at least two locating pins corresponding to the locating pins of the first and second supporting members, the bottom panel comprising a pair of flanges slidingly receiving the supporting board of the second supporting member therebetween, a locating hole being defined in the bottom panel for receiving the locating portion of the second supporting member therein; and a second bracket slidable engaging with the third supporting member of the connecting bracket, the second bracket comprising a side panel and a bottom panel, tee bottom panel comprising a pair of flanges slidingly receiving the supporting board of the third supporting member therebetween, at least one locating pin being arranged at the bottom panel corresponding to the at least one locating pin of the locating board of the third supporting member, a locating hole being defined in the bottom panel for receiving the locating portion of the third supporting member therein.

2. The disk drive bracket in accordance with claim 1, wherein the locating boards of the first and the supporting members respectively depend from said one side and side opposite side of the connecting board.

3. The disk drive bracket in accordance with claim 2, wherein the supporting boards of the first and third supporting members respectively extend substantially perpendicularly outwardly from respective lower portions of the locating boards of the first and third supporting members.

4. The disk drive bracket in accordance with claim 3, wherein the locating board of the second Coring member depends from a distal portion of the supporting board of the first supporting member.

5. The disk drive bracket in accordance with claim 4, wherein the supporting board of the second supporting member extends substantially perpendicularly outwardly from a lower portion of the locating board of the second supporting member.

6. The disk drive bracket in accordance with claim 1, wherein a pair of seats is arranged at the supporting board of the second supporting member, and a pair of seats is arranged at the supporting board of the third supporting member, for supporting the data storage devices thereon.

7. The disk drive bracket in accordance with claim 6, wherein each of the spring arm is arranged between a corresponding pair of seats of a respective one of the second and third supporting members.

8. The disk drive bracket in accordance with claim 1, wherein the first bracket and second bracket each comprise a fixing portion.

9. The disk drive bracket in accordance with claim 8, wherein the fixing portions each comprise at least one screw hole and at least one slot, for fastening the first and second brackets to the enclosure.

10. The disk drive bracket in accordance with claim 1, wherein a stop is arranged at the bottom panel of each of the first and second brackets, for engagingly receiving an end of the supporting board of a respective one of the second and third supporting members.

11. The disk drive bracket in accordance with claim 1, wherein the flanges are upwardly formed from the bottom panels of the first and second brackets.

12. The disk drive bracket in accordance with claim 1, wherein each of the flanges has an L-shaped profile, and free edges of the flanges of each of the first and second brackets oppose each other across the corresponding bottom panel.

13. The disk drive bracket in accordance with claim 1, wherein a cantilever is inwardly formed at the side panel of the fit bracket, for cooperating with the supporting board of the first supporting member to support a data storage device.

14. The disk drive bracket in accordance with claim 1, wherein the locating pins of the second bracket are upwardly formed from opposite sides of the bottom panel of the second bracket.

15. The disk drive bracket in accordance with claim 14, wherein the locating pins of the second bracket are generally L-shaped.

16. A disk drive bracket for holding data storage devices in an enclosure, the disk drive bracket comprising:

a connecting bracket comprising a connecting board adapted to be fixed to the enclosure, the connecting board comprising at least one side supporting member, the at least one side supporting member comprising a locating board having at least one locating pin, and a supporting board having a locating portion; and at least one side bracket slidably engaging with the at least one side supporting member of the connecting bracket, the at least one side bracket comprising a side panel having at least one locating pin corresponding to the at least one locating pin of the at least one side supporting member, and a bottom panel defining a locating bole for receiving the locating portion of the at least one side supporting member.

17. An enclosure comprising:

a cover;

a connecting bracket comprising a connecting board adapted to be fastened to the cover, the connecting board comprising at least one side supporting member, the at least one side supporting member comprising a supporting board and a locating board having at least one locating pin; and at least one side bracket slidably engaging with the at least one side supporting member of the connecting bracket, the at least one side bracket cooperating with the at least one side supporting member to define at least one space for receiving at least one data storage device therein, the at least one side bracket comprising a side panel having at least one locating pin corresponding to the at least one locating pin of the at least one side supporting member, and a fixing portion for fastening the at least one side bracket to the cover.

18. The enclosure in accordance with claim 17, wherein the cover comprises a plurality of screw seats and a plurality of securing clips.

19. The enclosure in accordance with claim 18, wherein the connecting board of the connecting bracket and the fixing portion of the at least one side bracket each have at least one screw hole and at least one slot, for respective engagement at the screw seats and the securing clips of the cover.

20. A computer enclosure comprising:

a cover;

a central connecting bracket fixed to the cover in an elevational manner, said connecting bracket defining first and second supporting members on two opposite sides thereof;

first and second side brackets positioned by two sides of said connecting bracket, each of said first and second side brackets defining first and second bottom panels, respectively;

said first bottom panel intimately placed against and horizontally attached to said first supporting member to define a first space between the first supporting member and the first side bracket for receiving a first electronic device therein;

said second bottom panel intimately placed against and horizontally attached to said second supporting member to define a second space between the second supporting member and the second side bracket for receiving a second electronic device therein;

said first and second side brackets being fastened to the cover, respectively; wherein said first space and said second space are juxtaposed with each other.

* * * * *